United States Patent [19]

Cadwell et al.

[11] 3,853,267

[45] Dec. 10, 1974

[54] DIGITAL SUBTRACTION SYSTEM AND METHOD FOR DETERMINING NET WEIGHT

[75] Inventors: Robert M. Cadwell, San Jose; Frank C. Rock, Santa Rosa, both of Calif.

[73] Assignee: National Controls, Inc., Santa Rosa, Calif. ; by said Rock

[22] Filed: Feb. 1, 1974

[21] Appl. No.: 438,936

[52] U.S. Cl. ........ 235/151.33, 177/25, 235/92 WT, 235/168
[51] Int. Cl. .......................... G06f 15/20, G06f 7/50
[58] Field of Search . 235/151.33, 168, 176, 92 WT; 177/6, 25

[56] References Cited
UNITED STATES PATENTS 3,375,357  3/1968  Dekker et al. ............. 235/151.33 X
3,551,657  12/1970  Darrington .................... 235/151.33
3,684,875  8/1972  Smith et al. .................... 235/151.33

Primary Examiner—Malcolm A. Morrison
Assistant Examiner—Jerry Smith
Attorney, Agent, or Firm—Flehr, Hohbach, Test Albritton & Herbert

[57] ABSTRACT

Digital subtraction system and method utilizing unidirectional counters which has particular utility in determining net weight from gross weight and tare weight. The gross weight and tare weight can be either positive or negative, and both the polarity and the magnitude of the difference are displayed. Either the gross weight or the tare weight can be displayed if desired, and a double subtraction can be performed to determine changes in net weight.

9 Claims, 6 Drawing Figures

DIGITAL SUBTRACTION SYSTEM AND METHOD FOR DETERMINING NET WEIGHT

BACKGROUND OF THE INVENTION

This invention pertains generally to digital apparatus and more particularly to a digital subtraction system and method for determining the net weight of a load on a scale.

Digital subtraction techniques provide a convenient method of subtracting tare weight from gross weight to determine and display the net weight of a load on a scale. Digital subtractors heretofore utilized in this regard have, however, had certain drawbacks and disadvantages. For example, some prior systems have required relatively expensive up-down counters to effect the desired subtraction, and some can handle only positive weights. With such systems, if either the tare weight or the gross weight is negative, the displayed net weight will be in error.

If changes in net weight are to be displayed, a double subtraction operation is necessary to subtract both the weight necessary to zero the scale and the tare weight from the gross weight. Most prior art subtraction techniques do not have a double subtraction capability, and they cannot be readily expanded to provide it.

SUMMARY AND OBJECTS OF THE INVENTION

The digital subtraction system and method of the invention provide a true algebraic subtraction of two numbers such as gross weight and tare weight. The numbers can be either positive or negative, and both the sign and the magnitude of the difference are displayed. Means is included for selectively displaying either the net weight, the gross weight, or the tare weight. The system and method have a double subtraction capability which permits the display to be set to zero at any desired time, following which the display will indicate changes in the net weight.

It is in general an object of the invention to provide a new and improved digital subtraction system and method.

Another object of the invention is to provide a digital subtraction system and method of the foregoing character which are particularly suitable for use in determining the net weight of a load on a scale.

Another object of the invention is to provide a digital subtraction system and method of the above character which permits either net weight, gross weight, tare weight, or changes in net weight to be displayed.

Another object of the invention is to provide a digital subtraction system and method of the above character utilizing relatively inexpensive unidirection counters.

Additional objects and features of the invention will be apparent from the following description in which the preferred embodiments are set forth in detail in conjunction with the accompanying drawings.

DESCRIPTION OF THE PREFERRED EMBODIMENTS

The invention performs the subtraction A−B, where A and B are numbers of either polarity, representing, for example, gross weight and tare weight, respectively. According to the method of the invention, a timing signal defining a counting period having a duration corresponding to A is provided. The signs of A and B are compared, and the sign of B is stored. If the signs of A and B are the same, a clock signal is initially counted into a first counter toward a level corresponding to B. If the count in this counter reaches the level of B prior to the end of the counting period, the clock signal is then counted into a second counter for the remainder of the counting period. If the count in the first counter does not reach the level of B by the end of the counting period, the polarity of the stored sign is changed, and the clock signal is counted into the first and second counters until the count in the first counter reaches the level corresponding to B.

If, however, the signs of A and B are different, the clock signal is initially counted into the second counter until the end of the counting period. Then the polarity of the stored sign is changed and the clock signal is counted into the first and second counters until the count in the first counter reaches the level corresponding to B.

When the counting is completed, the stored sign and the final count in the second counter are displayed to indicate the polarity and magnitude of the difference A−B.

Figure 1:
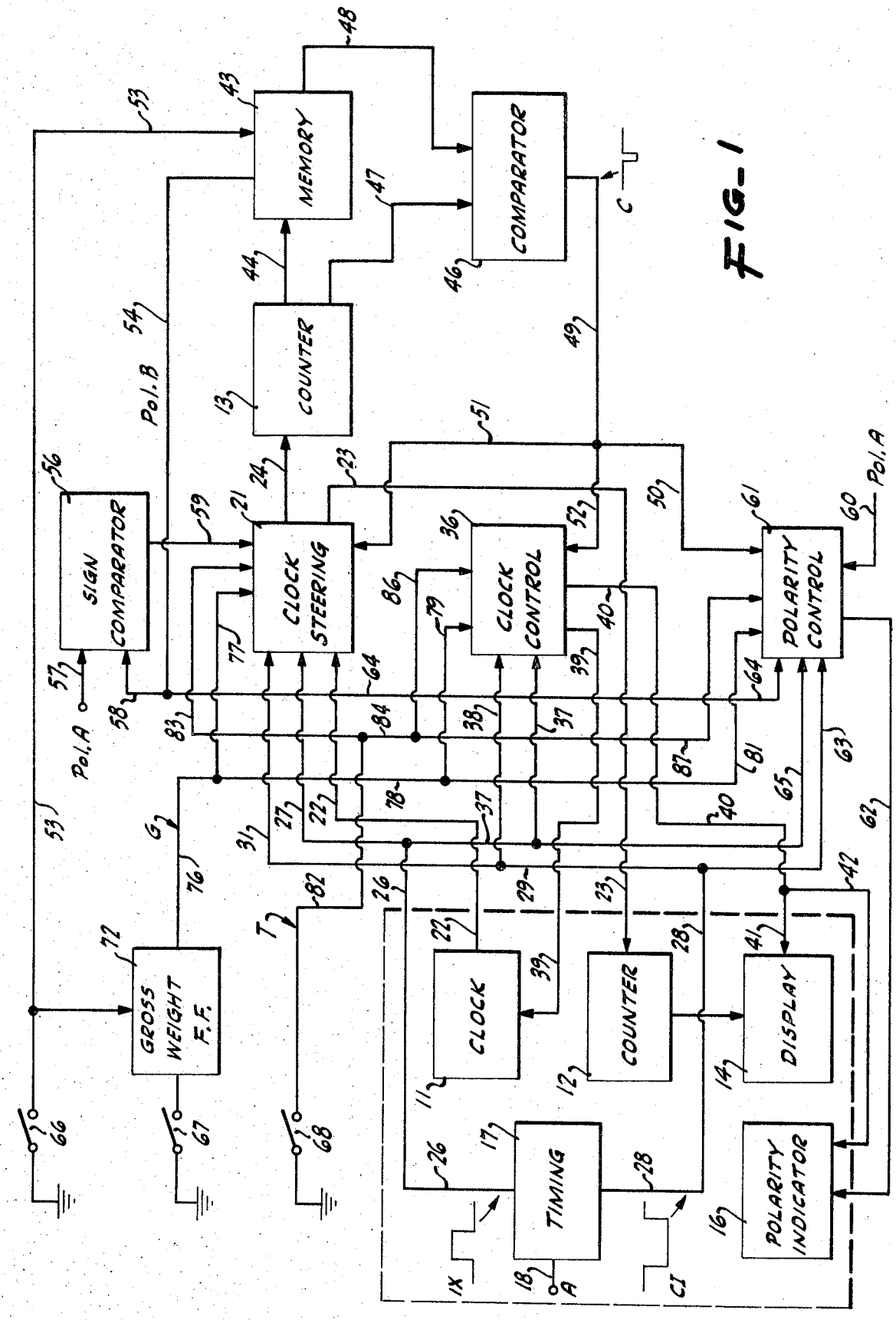
FIG. 1 is a block diagram of one embodiment of a digital subtraction system according to the invention for determining the net weight of a load on a scale.

As illustrated in FIG. 1, the subtraction system includes a clock 11, counters 12 and 13, a digital display 14, and a polarity indicator 16. All of these elements are of conventional design, and counters 12 and 13 are unidirectional binary counters, commonly known as up counters. Display 14 is connected to the output of counter 12, and it includes a plurality of Nixie tubes, seven segment display elements or other suitable means for displaying the count in counter 12. Polarity indicator 16 includes means for displaying a plus sign or a minus sign to indicate the polarity of the count displayed.

In one preferred embodiment, clock 11, counter 12, display 14 and polarity indicator 16 are parts of a conventional digital volt meter of the dual slope or double integration type. As is known to those familiar with the art, this type of meter includes a capacitor which is charged and discharged during first and second integration periods. During the first integration period, the capacitor is charged to a level corresponding to the level of an input voltage, and during the second integration period the capacitor is discharged from the charged level at a predetermined rate so that the duration of the second period corresponds to the input voltage. Pulses from the clock are counted during the second period to provide a digital indication of the input voltage. The volt meter circuits which determine the timing period are utilized in the subtraction system and designated generally as timing circuit 17. This circuit provides a first timing signal IX which defines the first integration period and is high during the same and a second timing signal CI which is low throughout the first and second integration periods. An analog signal representing the gross weight of a load on a scale is applied to timing circuit 17 through an input terminal 18, whereby the second integration period defined by the difference between timing signals CI and IX corresponds to the magnitude of the gross weight.

The output of clock 11 is connected to one input of a clock steering network 21 by a circuit 22. The steering network provides means for applying the clock pulses selectively to counters 12 and 13, and the outputs of the network are connected to the counters by circuits 23 and 24. Timing signals IX and CI are applied to the steering network by circuits 26 and 27 and circuits 28, 29 and 31, respectively.

Operation of clock 11 is controlled by a clock control 36. This control receives the IX and CI signals as inputs throught circuits 26 and 37 and circuits 28, 29 and 38, respectively. The output of the clock control is connected to the control input of the clock by a circuit 39. The clock control also delivers a strobe signal to display 14 through circuits 40 and 41 and to polarity indicator 16 through circuits 40 and 42.

The output of counter 13 is connected to a memory stage 43 by a suitable circuit 44 and to one input of a comparator 46 by a suitable circuit 47. The output of the memory stage is connected to a second input of the comparator by a circuit 48. The output of the comparator is connected to clock steering network 21 by circuits 49 and 51 and to clock control 36 by circuits 49 and 52. The memory stage is of conventional design for storing the count in counter 13 upon receipt of a signal on an input line 53. As is discussed more fully hereinafter, the count stored in memory 43 corresponds to the tare weight of the system on which the load is weighed. The memory stage delivers a signal Pol. B to an output line 54 corresponding to the polarity of the tare weight. Comparator 46 is a circuit of suitable design for providing an output signal C in the form of a negative pulse when the count in counter 13 reaches a level corresponding to the count stored in memory stage 43.

A sign comparator 56 is provided for comparing the signs of the gross weight and tare weight. The sign comparator receives input signals Pol. A and Pol. B. indicative of the polarities of the gross and tare weights through a circuit 57 and circuits 54 and 58, respectively. The output of the sign comparator is connected to clock steering network 21 by a circuit 59.

Means is provided for determining the polarity of the sign displayed by polarity indicator 16 in accordance with the magnitudes and polarities of the gross and tare weight signals. This means includes a polarity control 61 which is connected to the polarity indicator by a circuit 62. Timing signals CI and IX are applied to the polarity control by circuits 28 and 63 and circuits 26, 37 and 65, respectively, and the gross weight polarity signal Pol. A and the tare weight polarity signal Pol. B are applied to the polarity control by circuit 60 and by circuits 54 and 64, respectively. The comparator output signal C is applied to the polarity control through circuits 49 and 50.

Means is provided for selectively displaying either net weight, gross weight, or tare weight. This means includes switches 66, 67 and 68 which in the preferred embodiment are conventional pushbutton switches. Switch 66 is connected to memory state input line 53 and to a gross weight flip-flop 72 by a line 73 for transferring to the tare weight from counter 13 to memory stage 43 at any desired time. Switch 67 is also connected to gross weight flip-flop 72. The output of flip-flop 72 is connected to clock steering network 21 by circuits 76 and 77, to clock control 36 by circuits 76, 78 and 79, and to polarity control 61 by circuits 76, 78 and 81. Switch 68 is connected to the steering network by circuits 82 and 83, to the clock control by circuits 82, 84 and 86, and to the polarity control by circuits 82, 84 and 87.

Operation and use of the subtraction system to determine net weight can now be described. An analog signal A corresponding to gross weight is applied to input terminal 18, and switch 66 is momentarily closed to store a count B corresponding to tare weight in memory 43. The signs of gross weight A and tare weight B are compared by sign comparator 56, and the output of polarity control 61 corresponds initially to the sign of tare weight B. If the signs of the gross weight and tare weight are the same, steering network 21 delivers the pulses from clock 11 to counter 13 at the outset of the second integration which is defined by the trailing or negative going edge of timing signal IX. When the count in counter 13 reaches the level of tare signal B, comparator 46 delivers an output signal C to the steering network and clock control. If signal C is delivered prior to the end of the counting period, as defined by the trailing or positive going edge of timing signal CI, the steering network will direct the clock pulses to counter 12 for the remainder of the counting period. If the count in counter 13 does not reach the level of tare signal B by the end of the counting period, polarity control 61 changes the sign of the signal at its output, and the steering network applies the clock pulses to both counter 12 and counter 13 until the count in counter 13 reaches the level of tare count B.

If the signs of the gross and tare weight signals are different, the steering network applies the clock pulses to counter 12 throughout the counting period. At the end of this period, the sign at the output of polarity control 61 is changed, and the steering network applies the clock pulses to both counters until the count in counter 13 corresponds to the level of tare count B.

When the counting is completed, that is when comparator 46 has delivered its output signal and the trailing edge of timing signal CI has occured, clock control 36 turns off the clock and delivers a display or strobe signal to polarity indicator 14 and digital display 16, causing these elements to display the sign then at the output of polarity control 61 and the count then registered by counter 12. Thus, the tare weight has been subtracted from the gross weight, and the displays indicate the polarity and magnitude of the net weight.

If a display of gross weight is desired, switch 67 is depressed, triggering flip-flop 72. Output signal G from flip-flop 72 conditions steering network 21 to apply the clock pulses to counter 12 throughout the counting period, whereby the count displayed corresponds to the gross weight. Likewise, signal G conditions polarity control 61 so that the sign of the gross weight is displayed.

Tare weight can be displayed by depressing switch 68. Signal T conditions steering network 21 to apply the clock pulses to counters 12 and 13 until the count in each reaches the level of tare signal B. In this case, the count displayed corresponds to the tare signal B. In this case, the count displayed corresponds to the tare weight, and the polarity control delivers the sign of the tare weight to the polarity indicator.

The invention can be used to find the difference between any two numbers of either polarity. The minuend is applied to input terminal 18 and the subtrahend is stored in memory 43. It will be understood that the number stored in memory stage 43 can be provided by any suitable generator, rather than being derived from counter 13, if desired.

Figure 2:
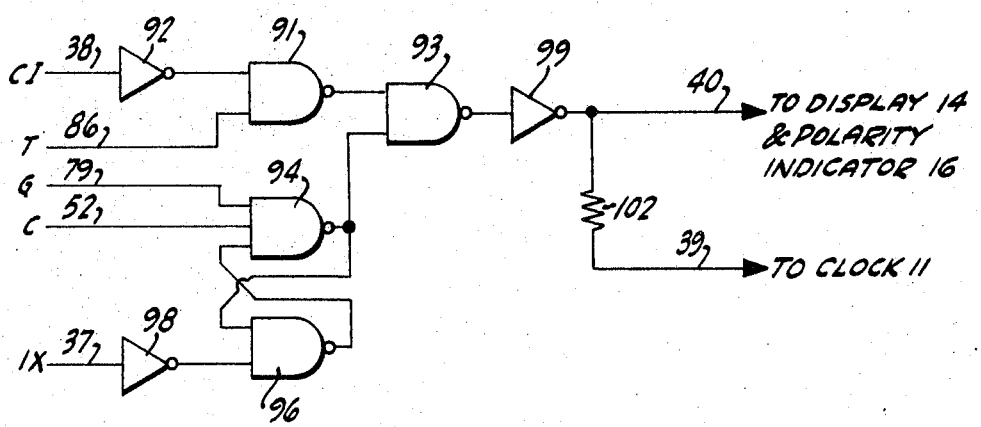
FIG. 2 is a circuit diagram of a clock control circuit for use in the system of FIG. 1.

FIG. 2 illustrates a preferred embodiment of a clock control for use in the system of FIG. 1. In this embodiment, timing signal CI is inverted and applied to one input of a NAND gate 91 by an inverter 92. This NAND gate receives the tare display command signal T from flip-flop 73 through circuit 86 as a second input. The output of NAND gate 91 is connected to one input of another NAND gate 93 which receives a second input from the output of cross-coupled NAND gates 94 and 96. NAND gate 94 receives the gross weight display command signal G as one input through circuit 79, and the comparator output signal C is applied to a second input of this NAND gate. The IX signal from circuit 37 is inverted and applied to an input of NAND gate 96 by an inverter 98. The output of NAND gate 93 is connected to the input of an inverter 99, and the output of this inverter is connected to the strobe inputs of display 14 and polarity indicator 16 through circuit 40. The output of inverter 99 is also coupled through a resistor 102 to the clock inhibit circuit 39.

The clock control conditions the clock to operate throughout the first and second integration periods. During the second integration period, the control delivers a shut-off signal to the clock upon the occurence of the end of the period and comparator signal C, the end of the period and gross weight display command signal G, or the comparator signal C and the tare weight display command signal T. When the shut-off signal is delivered to the clock, a display strobe signal is delivered to display 14 and polarity indicator 16.

Figure 3:
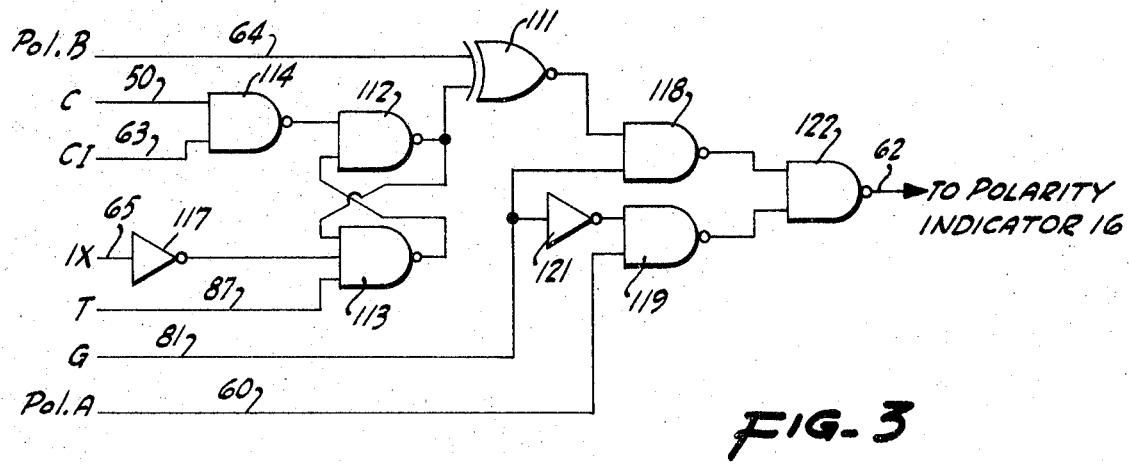
FIG. 3 is a circuit diagram of a polarity control circuit for use in the system of FIG. 1.

As illustrated in FIG. 3, polarity control 61 includes an exclusive NOR gate 111 which receives the tare weight polarity signal as one input through circuit 64. A second input of gate 111 is connected to the output of cross-coupled NAND gates 112 and 113. Comparator signal C is connected to one input of a NAND gate 114, and the output of NAND gate 114 is connected to one input of gate 112. Timing signal IX is inverted and applied to one input of NAND gate 113 by an inverter 117, and the tare weight display command signal T is applied to another input of NAND gate 113 by circuit 87.

The output of exclusive NOR gate 111 is connected to one input of a NAND gate 118. This NAND gate receives the gross weight display command signal G as a second input through circuit 81. This command signal is also inverted and applied to one input of a NAND gate 119 by an inverter 121. The gross weight polarity signal is applied to a second input of NAND gate 119 by circuit 60. The outputs of NAND gate 118 and 119 are connected to the inputs of a NAND gate 122, and the output of this gate is connected to polarity indicator 16 by circuit 62.

In operation, the polarity control delivers the sign of tare weight signal B to the polarity indicator at the outset of the counting period. The polarity of the sign delivered to the polarity indicator is reversed if the counting period ends before the occurrence of comparator signal C. If a gross weight display command signal G is present, the output has the polarity of gross weight signal A. Similarly, if a tare weight display command signal T is present, the output has the polarity of tare weight signal B.

Figure 4:
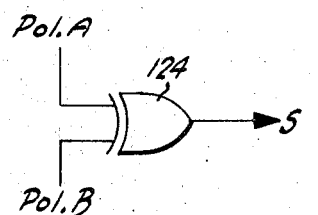
FIG. 4 is a circuit diagram of a sign comparator for use in the system of FIG. 1.

As illustrated in FIG. 4, sign comparator 56 comprises an exclusive OR gate 124 which receives the gross weight signal Pol. A and the tare weight polarity signal Pol. B as inputs. The output of gate 124, designated S, will be 0 if the signs of A and B are the same, and it will be 1 if the signs are different.

Figure 5:
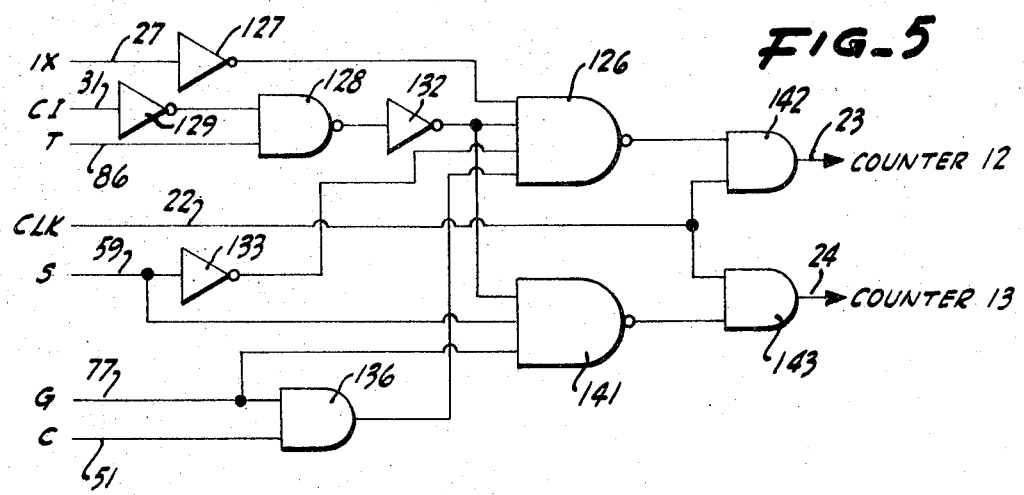
FIG. 5 is a circuit diagram of a clock steering network for use in the system of FIG. 1.

The clock steering network illustrated in FIG. 5 includes a NAND gate 126. Timing signal IX is inverted and applied to one input of this gate by an inverter 127. Timing signal CI is inverted and applied to one input of a NAND gate 128 by an inverter 129, and tare weight display command signal T is applied to a second input of gate 128. The output of NAND gate 128 is inverted and connected to a second input of NAND gate 126 by an inverter 132. Sign signal S is inverted and applied to a third input of NAND gate 126 by an inverter 133. Gross weight display command signal G and comparator signal C are applied to the inputs of an AND gate 136. The output of AND gate 136 is connected to a fourth input of NAND gate 126. The output of inverter 132 is also connected to a first input of a NAND gate 141, and sign signal S is applied to a second input of this gate. The gross weight display command signal G is applied to a third input of gate 141. The outputs of NAND gates 126 and 141 are connected to inputs of AND gates 142 and 143, respectively. Each of these AND gates receives the clock pulses as a second input from circuit 22. The output of AND gate 142 is connected to counter 12 by circuit 23, and the output of AND gate 143 is connected to counter 13 by circuit 24.

In operation, NAND gate 126 conditions AND gate 142 to apply the clock pulses to counter 12 during the first integration period. During the second integration period, the pulses continue to be applied to counter 12 if the signs of the gross and tare weight signals are different. If the signs are the same, NAND gate 126 blocks the passage of clock pulses through AND gate 142 during the second integration period until the occurrence of either comparator signal C or the end of the period, whichever occurs first. Thereafter, NAND gate 126 conditions AND gate 142 to pass the clock pulses to counter 12 until the clock is shut off. NAND gate 126 also conditions AND gate 142 to apply clock pulses to counter 12 until the clock is turned off if either a gross weight display command signal G or a tare weight display command signal T is present.

NAND gate 141 conditions AND gate 143 to apply the clock pulses to counter 13 during the second integration period if the signs of the gross and tare weights are the same or if a gross display command signal G or a tare display command signal T is present. If the signs of the gross and tare weights are different, NAND gate 141 conditions AND gate 143 to block the passage of clock pulses to counter 13 until the counting period ends and then to pass the clock pulses to the counter until comparator signal C is delivered.

Figure 6:
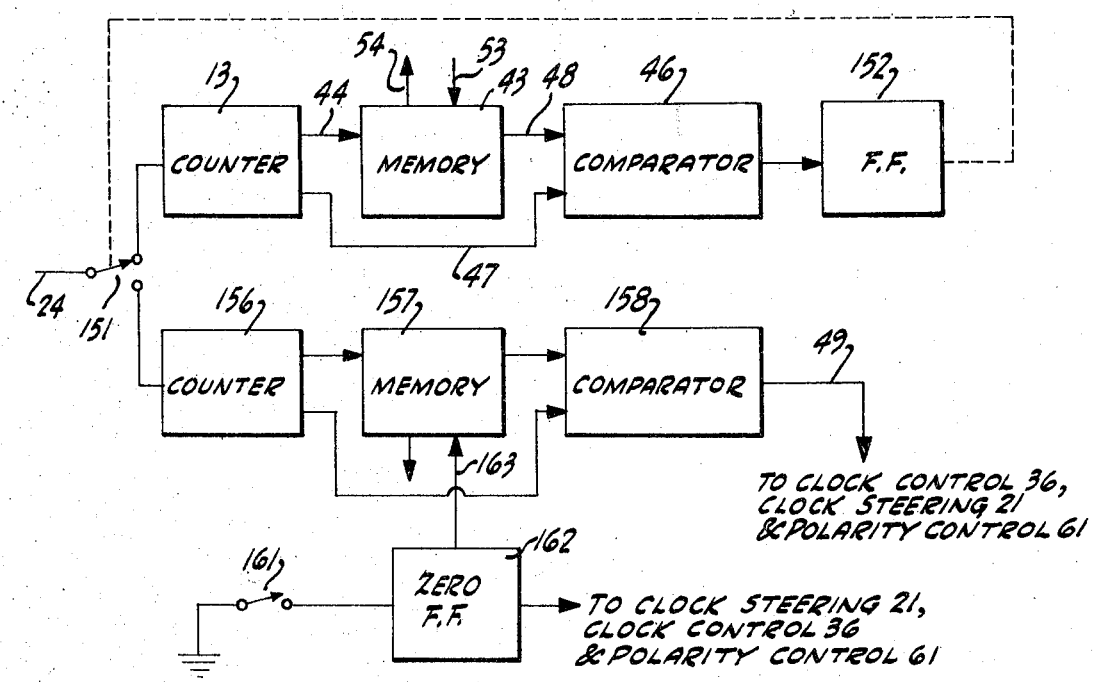
FIG. 6 is a block diagram illustrating the manner in which the system of FIG. 1 can be modified to provide a double subtraction capability.

FIG. 6 illustrates a modification of the system to permit double subtractions to be performed. In this embodiment, a switch 151 is inserted between the output of clock steering network 21 and the input of counter 13. The output of comparator 46 is applied to a flip-flop 152 which controls the operation of switch 151. This embodiment also includes an additional counter 156, memory stage 157 and comparator 158 which are similar to counter 13, memory stage 43 and comparator 46. The output of comparator 158 is connected to steering network 21 and clock control 36 through circuit 49.

Means is provided for storing the net weight at any desired time in memory 157 whereby that weight can be subtracted to zero the system and condition it to display changes in net weight. This means includes a switch 161 and a flip-flop 162. Switch 161 is preferably a pushbutton switch, and the output of flip-flop 162 is connected to memory 157 by a circuit 163. The output of the flip-flop is also connected to steering network 21, clock control 36, and polarity control 61 in a manner similar to flip-flops 72 and 73.

Operation and use of the modified system to effect a double subtraction and display changes in net weight can now be described. Switch 161 is closed momentarily to store the net weight signal to be subtracted in memory 157. The tare weight is stored in memory 43 by closing switch 66. It is assumed that the gross weight, tare weight and net weight to be subtracted are all positive and that the gross weight is greater than the sum of the tare weight and the net weight to be subtracted. The sign to be displayed is initially made positive by polarity control 61, and the clock pulses are applied to counter 13. When the count in this counter reaches the level of the tare weight stored in memory 43, flip-flop 152 switches switch 151, applying the clock pulses to counter 156. When the count in this counter reaches the level of the net weight signal stored in memory 157, comparator 158 delivers a signal similar to C to steering network 21, and thereafter the clock pulses are applied to counter 12 until the end of the counting period. The sign and count displayed when the count is completed indicate the polarity and magnitude of the change in net weight.

Next assume that the gross weight, tare weight and net weight to be subtracted are all positive again, but that the gross weight is larger than the net weight to be subtracted and smaller than the sum of the tare weight and the net weight to be subtracted. The polarity control again sets the sign positive initially, and the clock pulses are initially applied to counter 13. When the count reaches the level of the signal stored in memory 43, flip-flop 152 switches switch 151, applying the clock pulses to counter 156. At the end of the counting period, the polarity control changes the sign, and thereafter the clock pulses are applied to counter 12 and to counter 156 until the count in counter 156 reaches the level of the signal stored in memory 157. Once again, the sign and count displayed correspond to the change in net weight.

It is apparent from the foregoing that a new and improved digital subtraction system and method which are particularly suitable for determining net weight have been provided. While only the presently preferred embodiments have been described herein, as will be apparent to those familiar with the art, certain changes and modifications can be made without departing from the scope of the invention as defined by the following claims.

We claim:
1. In apparatus for determining the net weight of a load on a scale from signals representing gross weight and tare weight:
   A. first and second digital counters;
   B. a source of clock pulses;
   C. means for providing a timing signal defining a counting period having a duration corresponding to the gross weight signal;
   D. means for comparing the signs of the gross weight and tare weight signals;
   E. means for storing the sign of the tare weight signal at the outset of the counting period;
   F. means for
      1. applying the clock pulses initially to the first counter if the signs compared are the same,
         a. if the count in the first counter reaches a level corresponding to the tare signal prior to the end of the counting period, applying the clock pulses to the second counter for the remainder of the counting period,
         b. if the count in the first counter does not reach the level corresponding to the tare signal by the end of the counting period, changing the polarity of the stored sign and applying the clock pulses to the first and second counters until the count in the first counter reaches the level corresponding to the tare signal;
      2. applying the clock pulses initially to the second counter from the outset of the counting period to the end of the counting period if the signs compared are different,
         a. changing the polarity of the stored sign at the end of the counting period, and
         b. thereafter applying the clock pulses to the first and second counters until the count in the first counter reaches the level corresponding to the tare signal; and
   G. means for displaying the stored sign and the final count in the second counter to indicate the net weight of the load.

2. Apparatus as defined by claim 1 further including means for optionally displaying the sign of the gross weight signal and applying the clock pulses to the second counter throughout the counting period whereby the count displayed corresponds to the gross weight.

3. Apparatus as defined by claim 1 further including means for optionally displaying the sign of the tare weight signal and applying the clock pulses to the first and second counters until the count in each reaches the level corresponding to the tare signal whereby the count displayed corresponds to the tare weight.

4. Apparatus as defined by claim 1 further including a third counter, means for storing a signal corresponding to the net weight at a predetermined time, and means for diverting the clock pulses to the third counter until the count in said third counter reaches a level corresponding to the stored net weight signal, whereby the count corresponding to the stored net weight signal is subtracted and the count displayed corresponds to the change in the net weight from the net weight at predetermined time.

5. An apparatus for subtracting a first number from a second number:
   A. first and second digital counters;
   B. a source of clock pulses;

C. means for providing a timing signal defining a counting period having a duration corresponding to the second number;
D. means for comparing the signs of the first and second numbers;
E. means for storing the sign of the first number at the outset of the counting period;
F. means for
  1. applying the clock pulses initially to the first counter if the signs compared are the same,
     a. if the count in the first counter reaches a level corresponding to the first signal prior to the end of the counting period, applying the clock pulses to the second counter for the remainder of the counting period,
     b. if the count in the first counter does not reach the level corresponding to the first signal by the end of the counting period, changing the polarity of the stored sign and applying the clock pulses to the first and second counters until the count in the first counter reaches the level corresponding to the first signal;
  2. applying the clock pulses initially to the second counter from the outset of the counting period to the end of the counting period if the signs compared are different,
     a. changing the polarity of the stored sign at the end of the counting period, and
     b. thereafter applying the clock pulses to the first and second counters until the count in the first counter reaches the level corresponding to the first signals; and
G. means for displaying the stored sign and the final count in the second counter to indicate the difference between the first and second numbers.

6. In a method for determining the net weight of a load from signals representing gross weight and the tare weight of a system on which the load is weighed, the steps of:
A. providing a timing signal defining a counting period having a duration corresponding to the gross weight signal;
B. providing a clock signal;
C. comparing the signs of the gross weight and tare weight signals;
D. storing the sign of the tare weight signal;
E. if the signs compared are the same,
  1. counting the clock signal into a first counter toward a level corresponding to the tare weight signal,
  2. if the count in the first counter reaches the level corresponding to the tare signal prior to the end of the counting period, counting the clock signal into a second counter for the remainder of the counting period,
  3. if the count in the first counter does not reach the level corresponding to the tare signal by the end of the counting period,
     a. changing the polarity of the stored sign, and
     b. counting the clock signal into the first and second counters until the count in the first counter reaches the level corresponding to the tare signal;
F. if the signs compared are different,
  1. counting the clock signal into the second counter until the end of the counting period,
  2. changing the polarity of the stored sign, and
  3. thereafter counting the clock signal into the first and second counters until the count in the first counter reaches the level corresponding to the tare signal; and
G. displaying the stored sign and the final count in the second counter to indicate the net weight of the load.

7. The method defined by claim 6 further including the steps of storing a signal corresponding to the net weight at a predetermined time and diverting clock pulses to a third counter until the count in said third counter reaches a level corresponding to the stored net weight signal, whereby the count corresponding to the net weight signal is subtracted and the count displayed corresponds to the change in the net weight from the net weight at the predetermined time.

8. The method defined by claim 6 further including the steps of applying the clock pulses to the first and second counters until the count in each reaches the level corresponding to the tare signal, and displaying the sign of the tare weight signal and the last named count to indicate the tare weight.

9. The method defined by claim 6 further including the steps of displaying the sign of the gross weight signal and applying the clock pulses to the second counter throughout the counting period whereby the count displayed corresponds to the gross weight.

* * * * *